(12) United States Patent
Gerligand

(10) Patent No.: US 8,439,499 B2
(45) Date of Patent: *May 14, 2013

(54) METHOD FOR PRODUCING STABILIZED CONTACT LENSES

(75) Inventor: Pierre Gerligand, St. Johns, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/641,166

(22) Filed: Dec. 17, 2009

(65) Prior Publication Data

US 2011/0149233 A1  Jun. 23, 2011

(51) Int. Cl.
*G02C 7/04* (2006.01)
(52) U.S. Cl.
USPC ................ 351/159.74; 351/159.36
(58) Field of Classification Search ... 351/160 R–160 H, 351/177, 159.02–159.4, 159.73, 159.74, 351/159.77
See application file for complete search history.

(56) References Cited

U.S. PATENT DOCUMENTS

| | | | |
|---|---|---|---|
| 4,268,133 A | 5/1981 | Fisher et al. | |
| 4,874,234 A | 10/1989 | Wichterle | |
| 5,057,578 A | 10/1991 | Spinelli | |
| 5,314,960 A | 5/1994 | Spinelli et al. | |
| 5,371,147 A | 12/1994 | Spinelli et al. | |
| 5,540,410 A | 7/1996 | Lust et al. | |
| 5,652,638 A | 7/1997 | Roffman et al. | |
| 5,760,870 A | 6/1998 | Payor et al. | |
| 5,805,260 A | 9/1998 | Roffman et al. | |
| 5,912,719 A | 6/1999 | Baude et al. | |
| 6,183,082 B1 | 2/2001 | Clutterbuck | |
| 6,305,802 B1 | 10/2001 | Roffman et al. | |
| 6,467,903 B1 | 10/2002 | Back | |
| 6,554,425 B1 | 4/2003 | Roffman et al. | |
| 6,988,800 B2 | 1/2006 | Chou et al. | |
| 7,475,983 B2* | 1/2009 | Ye et al. | 351/160 R |
| 7,801,039 B2 | 9/2010 | Monette et al. | |
| 2005/0041202 A1 | 2/2005 | Jubin | |
| 2005/0237482 A1 | 10/2005 | Jubin et al. | |
| 2006/0055884 A1* | 3/2006 | Molinari et al. | 351/177 |
| 2008/0055545 A1 | 3/2008 | Clampa | |
| 2008/0079895 A1 | 4/2008 | Jubin | |
| 2009/0225273 A1 | 9/2009 | Clutterbuck | |

FOREIGN PATENT DOCUMENTS

| | | |
|---|---|---|
| EP | 0866354 A1 | 9/1998 |
| WO | WO 0175509 A1 | 10/2001 |
| WO | WO 2004010204 A1 | 1/2004 |
| WO | WO 2004097502 A1 | 11/2004 |

OTHER PUBLICATIONS

U.S. Appl. No. 12/641,058, filed Dec. 17, 2009; Entitled: Contact Lenses With Stabilization Features; Inventors: Pierre Gerligand et al.; Assignee: Johnson & Johnson Vision Care, Inc.
U.S. Appl. No. 12/641,089; Entitled: Stabilization of Contact Lenses ; Inventors: Edgar Menezes et al.; Assignee: Johnson & Johnson Vision Care, Inc., filed Dec. 17, 2009.

(Continued)

*Primary Examiner* — Darryl J Collins

(57) ABSTRACT

Contact lenses with stabilization zones are designed using mathematical constructs such as Bezier curves and which are subjected to modeling on-eye performance.

2 Claims, 7 Drawing Sheets

OTHER PUBLICATIONS

U.S. Appl. No. 12/641,116 ; Entitled: Method for Stabilizating Contact Lenses ; Inventors: Pierre Gerligand et al.; Assignee: Johnson & Johnson Vision Care, Inc., filed Dec. 17, 2009.
U.S. Appl. No. 12/641,144; Entitled: Stabilized Contact Lenses; Inventor: Pierre Gerligand; Assignee: Johnson & Johnson Vision Care, Inc., filed Dec. 17, 2009.
U.S. Appl. No. 12/641,182; Entitled: Contact Lens Eye Model ; Inventors: Willem Potze et al.; Assignee: Johnson & Johnson Vision Care, Inc., filed Dec. 17, 2009.
Written Opinion international Preliminary Report on Patentability for PCT/2010 061001 Date of Mailing Mar. 25, 2011.
Grant, Ross, "Mechanics of Toric Soft Lens Stabilization", Journal of the British Contact Lens Association, Elsevier, NL., vol. 9, No. Supplement 1, Jan. 1, 1986. pp. 44-47 XP007917345.
Written Opinion for PCT/US2010 060993 date of mailing Mar. 31, 2011.
U.S. Appl. No. 12/641,058, and Office Actions: Dec. 14, 2010; May 2, 2011.
U.S. Appl. No. 12/641,089, and Office Actions: Apr. 25, 2011; Oct. 28, 2011 and attachment; Feb. 13, 2012; Jun. 5, 2012.
U.S. Appl. No. 12/641,116, and Office Actions: Mar. 1, 2012; Jul. 26, 2012.
U.S. Appl. No. 12/641,144 and Office Actions: Nov. 9, 2011; Mar. 21, 2012; Aug. 1, 2012.
U.S. Appl. No. 12/641,166, and Office Actions: Dec. 29, 2010; May 18, 2011; Aug. 22, 2011; Nov. 17, 2011 and attachment; Apr. 4, 2012; Jun. 14, 2012; Aug. 7, 2012 and attachment.
U.S. Appl. No. 12/641,182 and Office Actions: Nov. 28, 2011; May 1, 2012; Jul. 20, 2012.
Conway, H., "The Motion of a Contact Lens Over the eye During Blinking", American Journal of Optometry & Physiological Optics, vol. 59, No. 10, pp. 770-773, Oct. 1982.
Knoll, H., et al. "Analysis of Blink-Induced Vertical Motion of Contact Lenses", Analysis of Blink-Induced Vertical Motion of Contact Lenses Jul. 2, 1986, Annual Meeting of the American Academy of Optometry.
Jones, M. B. et al., "Effect of tear additives on the shear stress and normal stress acting on the ocular surface", $16^{th}$ Australasian Fluid Mechanics Conference, Australia (Dec. 2-7, 2007): 616-620.
U.S Appl. No. 12/641,182 and Office Action: Oct. 16, 2012.

* cited by examiner

METHOD FOR PRODUCING STABILIZED CONTACT LENSES

BACKGROUND OF THE INVENTION

Correction of certain optical defects can be accomplished by imparting non-spherical corrective aspects to one or more surfaces of a contact lens such as cylindrical, bifocal, or multifocal characteristics. These lenses must generally be maintained at a specific orientation while on the eye to be effective. Maintenance of the on-eye orientation of a lens typically is accomplished by altering the mechanical characteristics of the lens. Prism stabilization including decentering of the lens' front surface relative to the back surface, thickening of the inferior lens periphery, forming depressions or elevations on the lens' surface, and truncating the lens edge are examples of stabilization approaches. Additionally, dynamic stabilization has been used in which the lens is stabilized by the use of thin zones, or areas in which the thickness of the lens' periphery is reduced. Typically, the thin zones are located at two regions that are symmetric about either the vertical or horizontal axis of the lens from the vantage point of its on-eye placement.

Evaluating lens design involves making judgments concerning the performance of the lens on-eye and then optimizing the design if necessary and possible. This process is typically done by clinically evaluating the test design in patients. However, this process is time consuming and expensive because it requires a significant number of patients to be tested since patient to patient variability must be accounted for.

There is a continuing need for improving the stabilization of certain contact lenses and the method of designing them.

SUMMARY OF THE INVENTION

The invention is a method of designing stabilized contact lens in which the stabilization zones are defined by a mathematical construct. The construct can be a Bezier curve.

In one aspect of the invention lenses are designed using coefficients of Bezier curve describing the upper portion of the angular thickness profile such that the Sag values are negative. When the stabilization zone is added to the lens periphery the thickness of the upper portion of the lens is reduced instead of being increased; reducing the thickness in the upper portion of the stabilization allows reducing the maximum thickness and still keeping the same thickness differential. Slopes around the location of maximum thickness are not too much affected with this profile change.

In another aspect of the invention the area containing negative sag values is applied on the upper and lower portion of the stabilization zones.

In another yet another aspect of the invention the maximum thickness of the stabilization zones differs between the left and the right side.

In yet another aspect of the invention the ramp of the thickness profile toward the positive and/or the negative angles can be adjusted to increase or decrease the ramp angle.

In yet another aspect of the invention lenses made according to the design method have improved stabilization.

DETAILED DESCRIPTION

Contact lenses of this invention have designs that optimize stabilization based on balancing various forces that act on the lenses. This involves the application of a design process that balances torques operating on the eye, components of the eye, and ultimately the stabilized lens that is placed on the eye. Preferably, improved stabilization is attained by starting the improvement process with a nominal design that includes stabilization elements. For example, a lens design that has two stabilization zones that are symmetric about both the horizontal and vertical axes running through the center is a convenient reference from which to optimize stabilization of the lens according the inventive methods. By "stabilization zone" is meant an area of the peripheral zone of the lens which has thickness values larger than the remaining areas of the peripheral zone. By "peripheral zone" is meant the area of the lens surface circumferentially surrounding the optic zone of the lens, and extending up to but not including the edge of the lens. The peripheral zone without stabilization zones will typically comprise a rotationally symmetric surface, preferably a spherical surface. Another stabilization design that is a useful starting point is described in US Patent Publication 20050237482 which is incorporated herein by reference but any stabilization design can be used as the nominal design that is then optimized according to this invention. The stabilization design improvement process can also incorporate testing the improvement with the eye model described below, evaluating the results of the testing, and continuing iteratively with the improvement process until a desirable level of stabilization is achieved.

Figure 1:
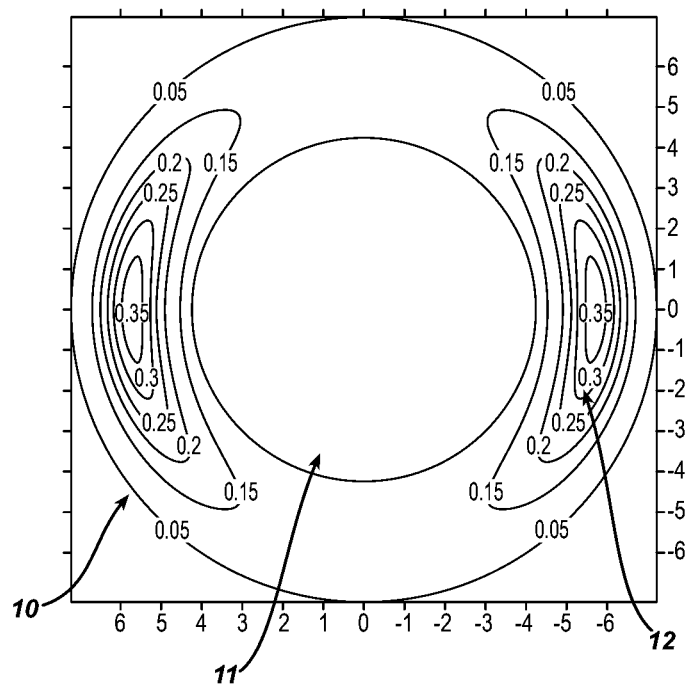
FIG. 1 is a front or object view of a stabilized contact lens.

FIG. 1 depicts the front, or object side, surface of a stabilized lens. Lens 10 has an optical zone 11. The lens' periphery surrounds optic zone 11. Two thick regions 12 are located in the periphery and are stabilization zones.

The model that is preferably used in the process to produce the new designs incorporates various factors and assumptions that simulate the mechanical operation and their effects on lens stability. Preferably, this model is reduced to software using standard programming and coding techniques according to well-known programming techniques. In broad overview, the model is used in the process for designing stabilized lenses by simulating the application of the forces described below in a prescribed number of blinks of the eye. The degree to which the lens rotates and decenters is determined accordingly. The design is then altered in a way that is directed to bringing rotation and/or centration to more desirable levels. It is then subjected to the model again to determine translation upon blinking after the pre-determined number of blinks.

The model assumes that the eye preferably consists of at least two spherical surface parts representing the cornea and the sclera and that the origin of the x-y-z coordinate axes is in the center of the sphere representing the cornea. More complex surfaces such as aspheric surfaces may also be used. The base shape of the lens consists of spherical surface parts but the base curve radius of the lens is allowed to change from the center of the lens towards the edge. More than one base curve may be used to describe the back surface. It is assumed that a lens positioned on the eye assumes the same shape as that of the eye. The thickness distribution of the lens need not necessarily be rotationally symmetric and indeed is not symmetric according to some preferred embodiments of the inventive lenses. Thick zones at the edge of the lens may be used to control the position and orientation behavior of the lens. A uniform thin film of liquid (tear film) exists between the lens and the eye, with a typical thickness of between 1 and 7 μm, preferably 5 μm. This tear film is referred to as the post-lens tear film. At the lens edge the thickness of the liquid film between the lens and eye is much smaller and is referred to as the mucin tear film. A uniform thin film of liquid (also, tear film) with a typical thickness of between 1 and 10 μm, preferably 5.0 μm exists between the lens and the lower and upper eyelids and these are referred to as the pre-lens tear films. The boundaries of both the lower and the upper eyelids lie in planes having unit normal vectors in the x-y plane. Hence, the projections of these boundaries on the plane perpendicular to the z-axis are straight lines. This assumption is also made during the motion of the eyelids. The upper eyelid exerts a uniform pressure on the contact lens. This uniform pressure is exerted on the whole area of the contact lens covered by the upper eyelid or on a part of this area near the boundary of the upper eyelid with uniform width (measured in the direction perpendicular to the plane through the curve describing the edge of the eyelid). The lower eyelid exerts a uniform pressure on the contact lens. This pressure is exerted on the whole area of the contact lens covered by the lower eyelid. The pressure exerted by the eyelids on the contact lens contributes to the torque acting at the lens through a non-uniform thickness distribution (thick zone) of the contact lens, especially near the edge. The effect of this pressure on the torques acting at the contact lens is referred to as the melon seed effect. Viscous friction exists in the post-lens tear film if the lens moves with respect to the eye. Viscous friction also exists in the mucin tear film between lens edge and the eye if the lens moves with respect to the eye. Additionally, viscous friction exists in the pre-lens tear film if the lens moves and/or the eyelids move. Strains and stresses in the lens occur due to the deformation of the lens. These strains and stresses result in an elastic energy content of the lens. As the lens moves with respect to the eye and the deformation of the lens changes, the elastic energy content changes. The lens tends toward a position at which the elastic energy content is minimal.

Figure 2A:
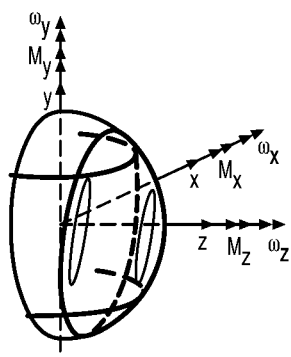
FIG. 2 is a schematic representation of an eye with an inserted lens; it identifies the axis of rotation and various torques acting at the lens.
Figure 2B:
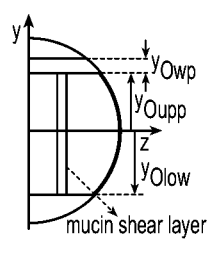
Figure 2C:
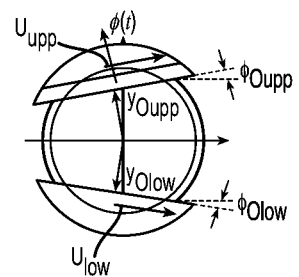

The parameters describing the geometry of the eye (cornea and sclera), base shape of the lens and the motion of the eyelids the eyelids are shown in FIG. 2. The motion of the lens follows from the balance of moment of momentum acting at the lens. Inertial effects are neglected. Then the sum of all moments acting at the lens is zero. Hence, $$\vec{0} = \vec{M}_{l,cor} + \vec{M}_{l,muc} + \vec{M}_{l,low} + \vec{M}_{l,upp} + \vec{M}_{l,Ulow} + \vec{M}_{l,Uup} + \vec{M}_{l,Vupp} + \vec{M}_{mslow} + \vec{M}_{m,supp} + \vec{M}_{elast} + \vec{M}_{grav}$$

The first 4 moments are resisting torques and are linearly dependent on the lens motion. The remaining torques are driving torques. This balance of moment of momentum results in a non-linear first order differential equation for the position β of the lens $$A(\vec{\beta}, t) \frac{d\vec{\beta}}{dt} = \vec{M}_{total}^{driving}(\vec{\beta}, t)$$

This equation is solved with a fourth order Runge-Kutta integration scheme. The positions of points on the contact lens follow from a rotation around the rotation vector β(t). The rotation matrix R(t) transforming the old position of points to the current position follows from Rodrigues's formula $$\vec{x}_{new} = \vec{x}_{old} + \sin\beta(\vec{n} \times \vec{x}_{old}) + (1 - \cos\beta)(\vec{n} \times (\vec{n} \times \vec{x}_{old}))$$

$$\vec{x}_{new} = R(t)\vec{x}_{old}$$

where $$\vec{n} = \frac{\vec{\beta}}{|\vec{\beta}|} \text{ and } \beta = |\vec{\beta}|.$$

In the numerical integration method a time-discretization is used. Then the motion of the lens can be seen as a number of subsequent rotations, hence at the next time step $t_{n+1}$ the rotation matrix is $$R_{n+1} = R_{\Delta t} R_n$$

where $R_{\Delta t}$ is the rotation during the time step Δt.

The rotation matrix is decomposed into a rotation $R_\alpha \alpha$ and a decentration $R_\theta$ of the lens $$R(t) = R_\theta(t) R_\alpha(t)$$

The rotation of the lens is a rotation around the centerline of the lens. The decentration is a rotation around a line in the (x, y) plane. Hence, the position of the lens is seen as a rotation $\vec{\alpha}$ of the lens around its centerline followed by a decentration $\vec{\theta}$.

The designs are made or optimized using the model described above by describing the design details using one or more mathematical constructs. Preferably, stabilization zones are described using Bezier curves but other mathematic descriptions can be used to get a full description of the stabilization zones. When the Bezier curve approach is used, a radial function $A_r(t_r)$ describing the radial thickness profile is defined preferably using five control points. An angular function $B_\alpha(t_\alpha)$ describing the angular thickness profile is also defined using five control points. For example, the mathematical description can be formulated as follows:

$$A_{r,x}(t_r) = P_{r1}(x) \cdot (1-t_r)^4 4 \cdot P_{r2}(x) \cdot (1-t_r)^3 \cdot t_r + 6 \cdot P_{r3}(x) \cdot (1-t_r)^2 \cdot t_r^2 + 4 \cdot P_{r4}(x) \cdot (1-t_r) \cdot t_r^3 + P_{r5}(x) \cdot t_r^4$$

$$A_{r,y}(t_r) = P_{r1}(y) \cdot (1-t_r)^4 4 \cdot P_{r2}(y) \cdot (1-t_r)^3 \cdot t_r + 6 \cdot P_{r3}(y) \cdot (1-t_r)_2 \cdot t_r^2 + 4 \cdot P_{r4}(y) \cdot (1-t_r) \cdot t_r^3 + P_{r5}(y) \cdot t_r^4$$

Where $P_{ri}(x)$ and $P_{ri}(y)$ are the coordinates of the control points and $t_r$ the normalized coordinate along the radial profile. The starting point that describes the radial thickness profile is defined by $P_{r1}$ and the ending point is defined by $P_{r5}$.

$$B_{\alpha,x}(t_\alpha)P_{\alpha 1}(x)\cdot(1-t_\alpha)^4+4\cdot P_{\alpha 2}(x)\cdot(1-t_\alpha)_3\cdot t_\alpha+ \\ 6\cdot P_{\alpha 3}(x)\cdot(1-t_\alpha)^2\cdot t_\alpha^2+4\cdot P_{\alpha 4}(x)\cdot(1-t_\alpha)\cdot t_\alpha^3+ \\ P_{\alpha 5}(x)\cdot t_\alpha^4$$

$$B_{\alpha,y}(t_\alpha)P_{\alpha 1}(y)\cdot(1-t_\alpha)^4+4\cdot P_{\alpha 2}(y)\cdot(1-t_\alpha)_3\cdot t_\alpha+ \\ 6\cdot P_{\alpha 3}(y)\cdot(1-t_\alpha)^2\cdot t_\alpha^2+4\cdot P_{\alpha 4}(y)\cdot(1-t_\alpha)t_\alpha\cdot t_\alpha^3+ \\ P_{\alpha 5}(y)\cdot t_\alpha^4$$

Where $P_{\alpha i}(x)$ and $P_{\alpha i}(y)$ are the coordinates of the control points and $t_\alpha$ the normalized coordinate along the angular profile. The starting point that describes the angular thickness profile is defined by $P_{\alpha 1}$ and the ending point is defined by $P_{\alpha 5}$.

The magnitude of the stabilization zone described by $C(t_r, t_\alpha)$ (3) is obtained from the product of the radial function $A_{r,y}$ by the angular function $B_{\alpha,y}$. A scaling factor M is applied to the product of the two functions to control the magnitude of the stabilization zone.

$$C(t_r,t_\alpha)=MA_{r,y}(t_r)\cdot B_{\alpha,y}(t_\alpha)$$

Theses equations can be extended for any number of control points. In that case the equations can be rewritten as:

$$X, Y = \sum_{i=1}^{N} C_i(P_{Xi,Yi}(1-t)^{N-i}t^{i-1})$$

$$C_1 = 1$$

$$C_i = \frac{(N-1)!}{i!(N-i)!}$$

A different set of functions can be used to describe the right stabilization zone from the left giving an asymmetrical stabilization zone design.

Figure 3A:
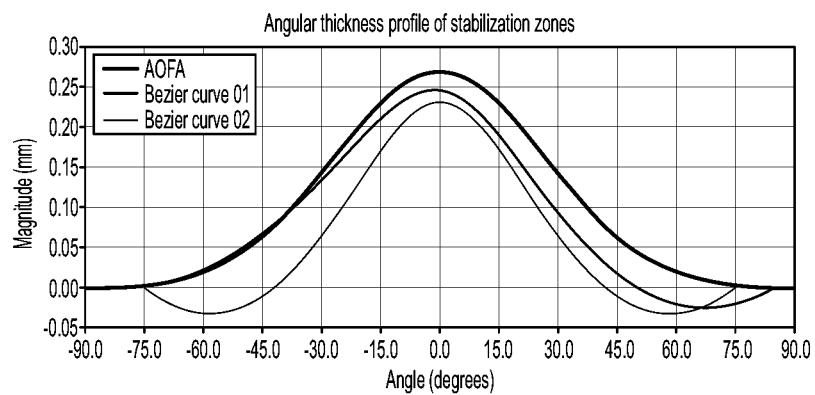
FIGS. 3A & 3B are new thickness profiles obtained from Bezier curves.
Figure 3B:
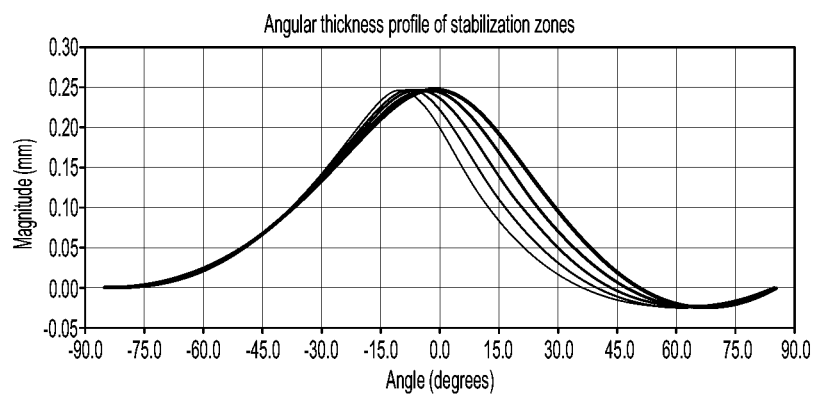

In a preferred embodiment of the invention the coefficients of Bezier curve describing the upper portion of the angular thickness profile are set such that the Sag values are negative. In that particular case when the stabilization zone is added to the lens periphery the thickness of the upper portion of the lens is reduced instead of being increased. FIGS. 3A & 3B show the effect of reducing the thickness in the upper portion of the stabilization zone. It allows reducing the maximum thickness and still keeping the same thickness differential. Slopes around the location of maximum thickness are not much affected with this profile change.

Preferably, the invention is used to design and then manufacture stabilized toric lenses or toric multifocal lenses as, for example, disclosed in U.S. Pat. Nos. 5,652,638, 5,805,260 and 6,183,082 which are incorporated herein by reference in their entireties.

As yet another alternative, the lenses of the invention may incorporate correction for higher order ocular aberrations, corneal topographic data, or both. Examples of such lenses are found in U.S. Pat. Nos. 6,305,802 and 6,554,425 incorporated herein by reference in their entireties.

As yet another alternative, the lenses of the invention may incorporate cosmetic features such a tint patterns which must be settle in a specific orientation on the eye to be cosmetically appealing.

The lenses of the invention may be made from any suitable lens forming materials for manufacturing ophthalmic lenses including, without limitation, spectacle, contact, and intraocular lenses. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

Curing of the lens material may be carried out by any convenient method. For example, the material may be deposited within a mold and cured by thermal, irradiation, chemical, electromagnetic radiation curing and the like and combinations thereof. Preferably, for contact lens embodiments, molding is carried out using ultraviolet light or using the full spectrum of visible light. More specifically, the precise conditions suitable for curing the lens material will depend on the material selected and the lens to be formed. Suitable processes are disclosed in U.S. Pat. No. 5,540,410 incorporated herein in its entirety by reference.

The contact lenses of the invention may be produced by any convenient method. One such method uses an OPTO-FORM™ lathe with a VARIFORM™ attachment to produce mold inserts. The mold inserts in turn are used to form molds. Subsequently, a suitable liquid resin is placed between the molds followed by compression and curing of the resin to form the lenses of the invention. One ordinarily skilled in the art will recognize that any number of known methods may be used to produce the lenses of the invention.

The invention will now be further described with respect to the following non-limiting examples.

EXAMPLE 1

A contact lens for astigmatic patients having a known design and which was designed using conventional lens design software with the following input design parameters was obtained:

Sphere power: −3.00 D

Cylinder Power: −0.75 D

Cylinder Axis: 180 deg

Lens diameter: 14.50 mm

Front optical zone diameter of 8.50 mm

Back optical zone diameter of 11.35 mm

Lens base curve: 8.55 mm

Figure 4A:
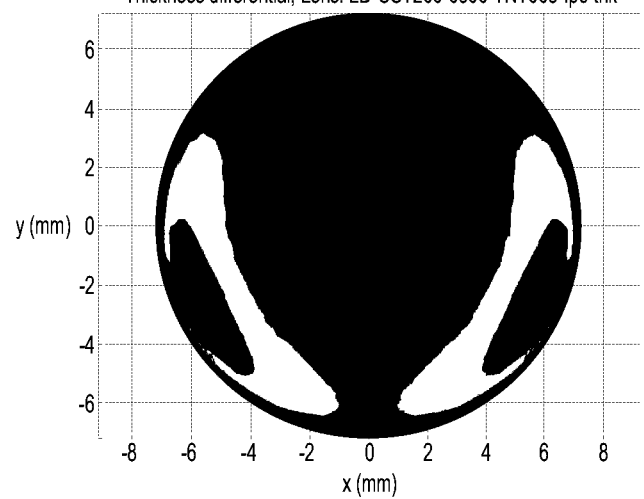
FIG. 4 is a Lens Thickness Map and Graph of Thickness Profiles for Example 1
Figure 4B:
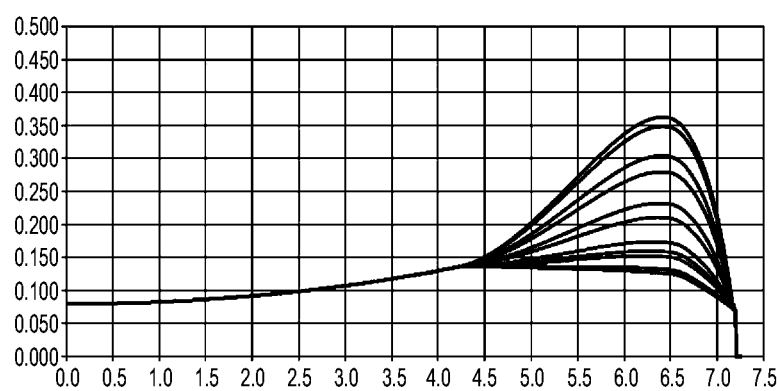

The original thickness profile of that lens is rotationally symmetrical in the peripheral zone. The stabilization zone is an extra thick zone added to the thickness profile of that lens. The left and right stabilization zones are constructed using a set of control points (Table 1) applied to the previously described mathematical functions. The Lens thickness profile is shown in FIG. 4

TABLE 1

Control points applied to example 1.

| | | Left stabalization zone | | Right stabalization zone | |
|---|---|---|---|---|---|
| | | Radical Ctrl points | Angular Ctrl points | Radical Ctrl points | Angular Ctrl points |
| Point 01 | X | 4.250 | 120 | 4.250 | -110 |
| | Y | 0.000 | 0.000 | 0.000 | 0.000 |
| Point 02 | X | 5.500 | 197 | 5.500 | -33 |
| | Y | 0.050 | -0.025 | 0.050 | -0.025 |
| Point 03 | X | 6.600 | 205 | 6.600 | -25 |
| | Y | 0.480 | 0.750 | 0.480 | 0.750 |
| Point 04 | X | 6.930 | 213 | 6.930 | -17 |
| | Y | 0.200 | -0.025 | 0.200 | -0.025 |
| Point 05 | X | 7.175 | 290 | 7.175 | 60 |
| | Y | 0.000 | 0.000 | 0.000 | 0.000 |
| Scaling factor | | 3.641 | | 3.641 | |

EXAMPLE 2

Figure 5A:
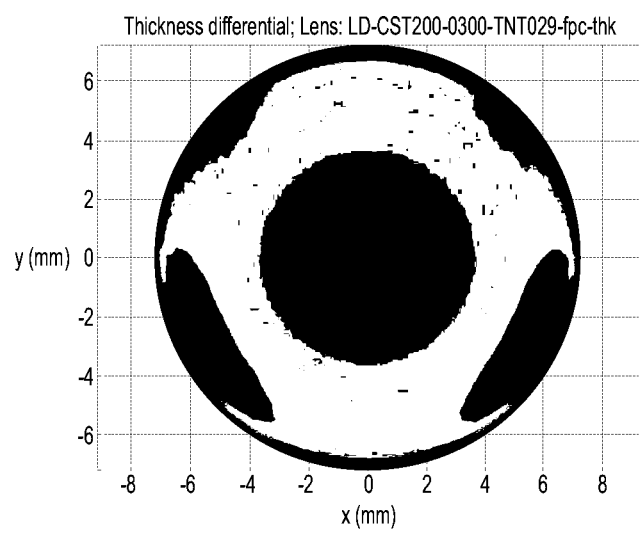
FIG. 5 is a Lens Thickness Map and Graph of Thickness Profiles for Example 2
FIG. 6 Is a Lens Thickness Map and Graph of Thickness Profiles for Example 3
FIG. 7 Is a Lens Thickness Map and Graph of Thickness Profiles for Example 4
Figure 5B:
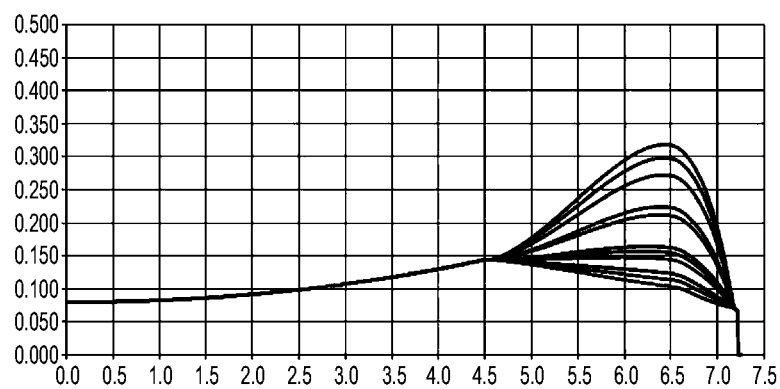

The lens described in Example 1 had the radial location of the stabilization zones pushed out by 0.25 mm such that the optic zone diameter was extended to 9.00 mm for the selected prescription. The left and right stabilization zones were constructed using a set of control points shown in Table 2 applied to the previously described mathematical functions. The upper portion of the stabilization zone thickness was reduced instead of being increased. The toric contact lens has an optic zone equivalent to what is usually offered with a conventional single vision lens. Modeling of the centration and rotation of the lens using the eye model described above showed the performance of the lens was not significantly affected by the relocation of the stabilization zones. The Lens thickness profile is shown in FIG. 5.

TABLE 2

Control points applied to example 2.

| | | Left stabilization zone | | Right stabilization zone | |
|---|---|---|---|---|---|
| | | Radial Ctrl points | Angular Ctrl points | Radial Ctrl points | Angular Ctrl points |
| Point 01 | X | 4.550 | 120 | 4.550 | -110 |
| | Y | 0.000 | 0.000 | 0.000 | 0.000 |
| Point 02 | X | 5.500 | 192 | 5.500 | -28 |
| | Y | 0.050 | -0.200 | 0.050 | -0.025 |
| Point 03 | X | 6.650 | 205 | 6.650 | -25 |
| | Y | 0.470 | 0.800 | 0.470 | 0.800 |
| Point 04 | X | 6.930 | 208 | 6.930 | -12 |
| | Y | 0.200 | -0.025 | 0.200 | -0.200 |
| Point 05 | X | 7.175 | 290 | 7.175 | 60 |
| | Y | 0.000 | 0.000 | 0.000 | 0.000 |
| Scaling factor | | 3.3 | | 3.3 | |

EXAMPLE 3

The lens described in Example 1 was redesigned using the method of the invention such that the magnitude of the left stabilization zone was reduced by 40 microns. The left and right stabilization zones were constructed using a set of control points as shown in Table 3 applied to the previously described mathematical functions.

Figure 6A:
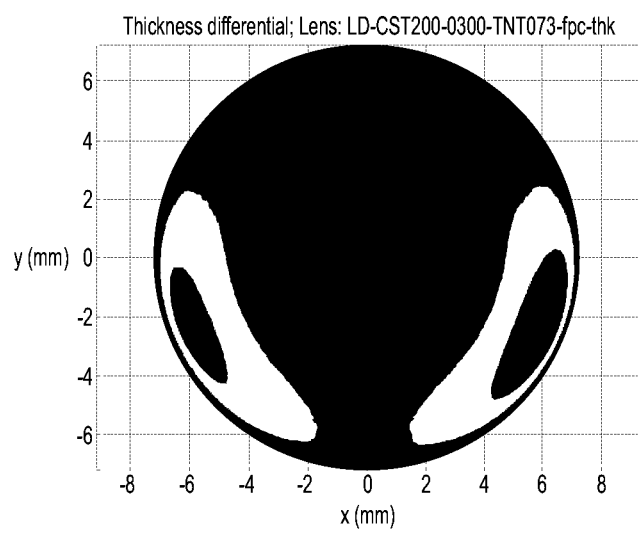
Figure 6B:
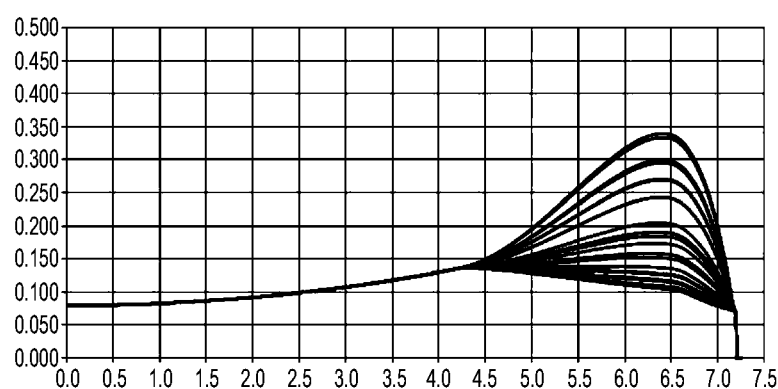

The introduction of dissymmetry in thickness requires a different design for left eye and right in order to keep same rotation performance on both eyes. The results from the eye model show better rotation performance of such designs when the thickest stabilization zone has to rotate from an upper to a lower position. The Lens thickness profile is shown in FIG. 6.

TABLE 3

Control points applied to example 3.

|  |  | Left stabilization zone | | Right stabilization zone | |
| --- | --- | --- | --- | --- | --- |
|  |  | Radial Ctrl points | Angular Ctrl points | Radial Ctrl points | Angular Ctrl points |
| Point 01 | X | 4.550 | 115 | 4.250 | −105 |
|  | Y | 0.000 | 0.000 | 0.000 | 0.000 |
| Point 02 | X | 5.500 | 187 | 5.500 | −23 |
|  | Y | 0.050 | −0.200 | 0.050 | −0.025 |
| Point 03 | X | 6.600 | 200 | 6.600 | −20 |
|  | Y | 0.480 | 0.800 | 0.480 | 0.800 |
| Point 04 | X | 6.930 | 203 | 6.930 | −7 |
|  | Y | 0.200 | −0.025 | 0.200 | −0.200 |
| Point 05 | X | 7.175 | 285 | 7.175 | 65 |
|  | Y | 0.000 | 0.000 | 0.000 | 0.000 |
|  |  |  |  |  |  |
| Scaling factor |  | 2.966 |  | 3.641 |  |
|  |  | Left stabilization zone | | Right stabilization zone | |
|  |  | Radial Ctrl points | Angular Ctrl points | Radial Ctrl points | Angular Ctrl points |
| Point 01 | X | 4.550 | 115 | 4.250 | −105 |
|  | Y | 0.000 | 0.000 | 0.000 | 0.000 |
| Point 02 | X | 5.500 | 187 | 5.500 | −23 |
|  | Y | 0.050 | −0.200 | 0.050 | −0.025 |
| Point 03 | X | 6.600 | 200 | 6.600 | −20 |
|  | Y | 0.480 | 0.800 | 0.480 | 0.800 |
| Point 04 | X | 6.930 | 203 | 6.930 | −7 |
|  | Y | 0.200 | −0.025 | 0.200 | −0.200 |
| Point 05 | X | 7.175 | 285 | 7.175 | 65 |
|  | Y | 0.000 | 0.000 | 0.000 | 0.000 |
|  |  |  |  |  |  |
| Scaling factor |  | 2.966 |  | 3.641 |  |

EXAMPLE 4

Figure 7A:
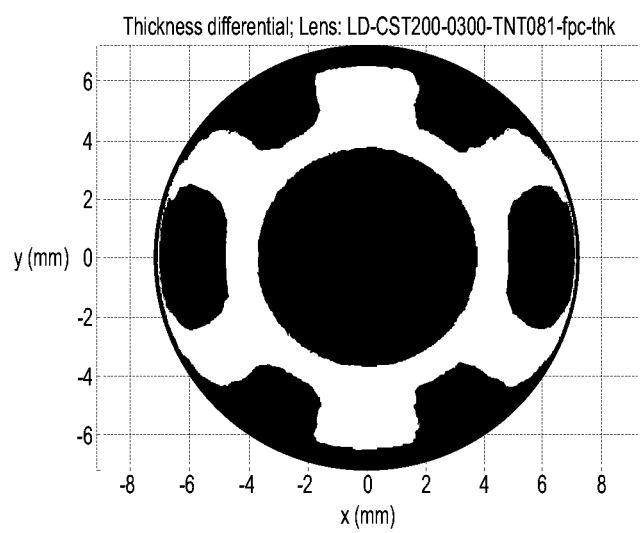
Figure 7B:
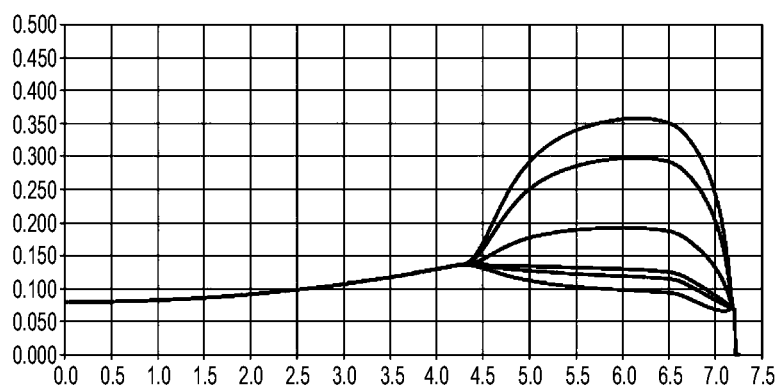

The lens design of example 1 was modified so that the magnitude of the left stabilization zone was reduced by 40 microns. The left and right stabilization zones were constructed using a set of control points shown in Table 4 applied to the previously described mathematical functions. The upper and lower portion of the stabilization zone thickness was reduced instead of being increased, reducing the thickness in the upper and lower portions of the stabilization zones and reducing the maximum thickness while retaining a similar thickness differential. The Lens thickness profile is shown in FIG. 7.

TABLE 4

Control points applied to example 4.

|  |  | Left stabilization zone | | Right stabilization zone | |
| --- | --- | --- | --- | --- | --- |
|  |  | Radial Ctrl points | Angular Ctrl points | Radial Ctrl points | Angular Ctrl points |
| Point 01 | X | 4.250 | 105 | 4.250 | -75 |
|  | Y | 0.000 | 0.000 | 0.000 | 0.000 |
| Point 02 | X | 4.750 | 170 | 4.750 | -10 |
|  | Y | -0.010 | -0.250 | -0.010 | -0.250 |
| Point 03 | X | 4.750 | 180 | 4.750 | 0 |
|  | Y | 0.400 | 0.950 | 0.400 | 0.950 |
| Point 04 | X | 5.500 | 190 | 5.500 | 10 |
|  | Y | 0.220 | -0.250 | 0.220 | -0.250 |
| Point 05 | X | 6.700 | 255 | 6.700 | 75 |
|  | Y | 0.230 | 0.000 | 0.230 | 0.000 |
| Point 06 | X | 7.050 |  | 7.050 |  |
|  | Y | 0.500 |  | 0.500 |  |
| Point 07 | X | 7.160 |  | 7.160 |  |
|  | Y | -0.010 |  | -0.010 |  |
| Point 08 | X | 7.175 |  | 7.175 |  |
|  | Y | 0.000 |  | 0.000 |  |
|  |  |  |  |  |  |
| Scaling factor |  | 3.641 |  | 3.641 |  |

Utilizing the eye model described herein, lenses from Examples 1, 2, and 3 show optimum rotation speed around the 40-50 degrees misalignment range. Designs from these examples are preferred for lenses with optics that depend on lens orientation such as custom vision correction lenses where the lens orientation is unidirectional due to the asymmetry of the stabilization zones along the horizontal axis. Those lenses also present higher rotation speed for lens orientations within 20 degrees from the final position compared to conventional marketed lenses. Further customization can be obtained from example 3 where the left and right stabilization zones are asymmetric. These designs and lenses present greater rotation speed for lens orientation within 30 degrees from the final position (relative to the existing commercial lenses).

The reduction of thickness in the stabilization zone did not affect lens performance in rotation when the magnitude of the thickness differential was kept as shown with examples 1 and 2 where the magnitude of the stabilization has been reduced by 10% from example 1 to example 2. The lens design of example 2 has a maximum stabilization zone thickness reduced by about 20% compared to conventional products making the lens more comfortable to the wearer.

Modeling of the lens of Example 4 showed slower rotation speed but less rotation speed variation across the lens orientation. The design from example 4 is preferred for lenses with optics that does not depend on lens orientation such as toric lenses where the lens orientation can be bidirectional due to the symmetry kept in the design of the stabilization zones.

I claim:

1. A method for stabilizing contact lenses comprising providing a lens design with a set of stabilization zone parameters and creating a contact lens design with improved stabilization based on the characterization of lens design parameters as a mathematical construct, modeling the design with a model that balances moments of momentum and models rotational effects, the effects of viscous friction and elastic energy content of the contact lens, and selecting the design based on the results of the modeling wherein said steps of modeling and selecting the design are conducted iteratively and wherein a virtual model that simulates the effects of eye mechanics is used to validate contact lens designs, the mathematical construct, including the coefficients of a Bezier curve, providing for a reduced thickness upper peripheral region while maintaining a required thickness differential.

2. The method of claim 1 wherein blinking is one of the eye mechanics and adjusts the stabilization scheme accordingly.

* * * * *